A. R. BROHET.
APPARATUS FOR MILKING COWS.
APPLICATION FILED SEPT. 12, 1914.
1,180,823.
Patented Apr. 25, 1916.
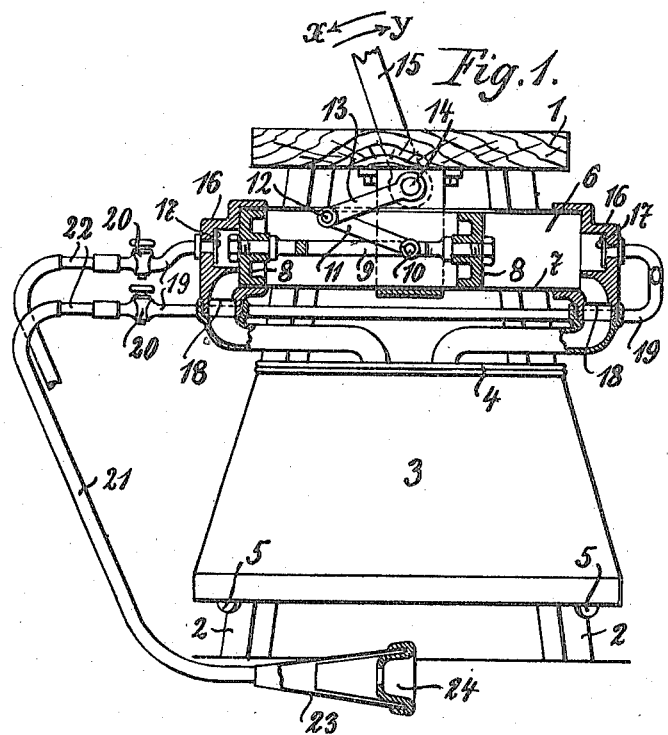
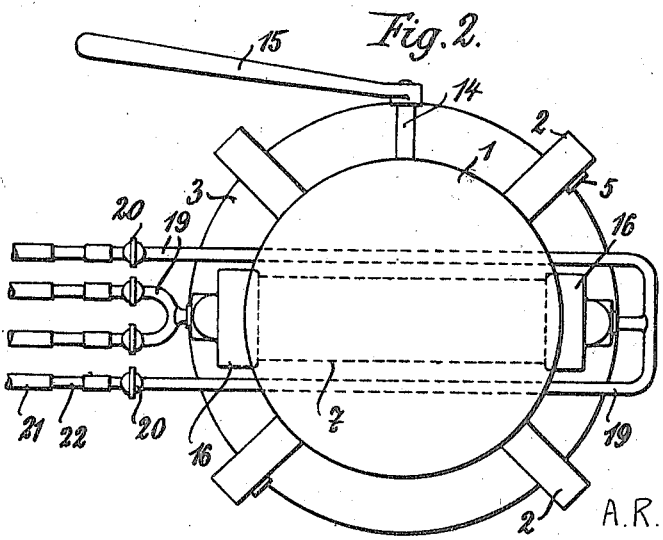
WITNESSES
Charles B. Crompton
May G. Luttrell
A. R. Brohet.
INVENTOR
BY G. Croydon Marks
ATTORNEY
THE COLUMBIA PLANOGRAPH CO., WASHINGTON, D. C.

UNITED STATES PATENT OFFICE.

ADOLPHE RENELDE BROHET, OF PARIS, FRANCE.

APPARATUS FOR MILKING COWS.

1,180,823.  Specification of Letters Patent.  Patented Apr. 25, 1916.

Application filed September 12, 1914. Serial No. 861,402.

*To all whom it may concern:*

Be it known that I, ADOLPHE RENELDE BROHET, a citizen of the French Republic, residing at No. 18 Boulevard Beaumarchais, in Paris, France, have invented certain new and useful Improvements in Apparatus for Milking Cows, of which the following is a specification.

This invention has for its object to provide an improved apparatus for milking cows, consisting of a seat beneath which there is located a pump fitted with two reciprocating pistons actuated by a lever on the side of the seat.

The milk on arrival is admitted through a valve and leaves through a second valve so as to flow into the milk pail or vessel without passing by the pistons of the pump. The milk vessel is located beneath the pump barrel between the legs of the seat, which enables the operator to be comfortably seated. The pump has four pipes fitted with cocks as well as control tubes, by which it can be ascertained whether milking through each teat is being well carried out. The end of each tube is provided with a cup made of tinned iron or other material inside which there is a small rubber pocket which produces the impression to the cow that she is suckling her calf. These rubber devices, while effecting the massage of the cow's teat rise and fall as the suction device is worked by the operator by means of the pump lever. The stroke may be made full or short according as the cow yields its milk with more or less ease. In this way a reciprocating movement takes place in the pump and thus each teat is milked in turn. Owing to this movement there is a return of air which prevents congestion of the teat, because suction, compression and massage are proceeding at the same time.

The invention and the method of carrying it into practice are illustrated by way of example in the accompanying drawings in which:—

Figure 1 is a sectional elevation of the pump; Fig. 2 is a plan of Fig. 1.

As shown, the improved apparatus consists of a seat 1 with four legs 2, between which is placed a pail or milk vessel 3, provided with a cover 4. This vessel is held in position by hooks 5 fixed to the legs 2. Beneath the seat is a pump 6 in the barrel 7 of which there work two pistons 8 connected by a rod 9. This rod is fitted with a joint 10 to which is fixed a small connecting rod 11, the other end of which is fixed to the joint 12 carried by the arm 13 which is fixed to the shaft 14, on the end of which the arm 15 is keyed.

Each end of the pump barrel is fitted with a head 16 in which are provided a suction valve 17 and a delivery valve 18. The suction valves 17 are each provided with a pipe 19 in which pipes are interposed cocks 20 by which one or more cups may be shut off. Each pipe 19 has a rubber tube 21 in which there is provided a window 22, through which the milking may be observed in order to see whether the teat is yielding normally. Each tube 21 is fitted with a cup 23 made of tinned iron or other material, in which there is a small rubber pocket 24 turned over the edges of the cup. The object of these small pockets is to give the cow the impression that it is suckling, while effecting the massage of the teats.

The valves 18 are provided with pipes 25 which convey the milk contained in the pump into the pail 3. In order to make use of this pump, the lever 15 is actuated by hand in the direction of the arrows $x$ and $y$ so as to impart a reciprocating movement to the pistons 8. When the cups 23 are put on the teats of a cow, suction will occur which will compel the rubber pockets 24 to descend, pulling on the teat so as to milk it. The milk passes through the pipes 21, the windows 22, the cocks 20 and the pipes 19, and reaches the valve 17, which opens under the suction. In the reverse movement, the piston 8 forces the milk through the valves 18 into the vessel 3 without passing by the pistons of the pump. When dealing with a cow difficult to milk, the pistons are worked full stroke so as to obtain very great suction; in the contrary case, that is, if a cow gives its milk easily, the pistons need only make short strokes.

The position occupied by the operator is a very convenient one because he is seated on the seat 1 and has the operating lever on hand at his right.

It is to be understood that the invention is not strictly limited to the example described and shown, and that it may vary in form, dimensions, dispositions and materials, according to practical requirements, and that it may be provided with a bell by means of which a larger number of cows may be milked at once.

Having now described my invention what I claim as new and desire to secure by Letters Patent is:—

1. In an apparatus for milking cows, the combination of a seat, a pump located beneath said seat, and comprising a cylinder and two reciprocating pistons therein, a lever located at the side of the seat for operating said pistons, a valve in each end of the cylinder for admitting the milk into the pump, and a valve for discharging the milk without the said milk passing by either of said pistons.

2. In an apparatus for milking cows, the combination of a seat, a pump located beneath said seat, and comprising a cylinder and two reciprocating pistons therein, a lever located at the side of the seat for operating said pistons, a valve in each end of the cylinder for admitting the milk into the pump, and a valve for discharging the milk without the said milk passing by either of said pistons, a plurality of milking pipes, communicating with said milk admission valves, rubber tubular extensions on said pipes, cups connected to said extensions, rubber pockets in said cups for fitting upon the teats and producing compression and massage thereof, and a glazed window in each of said rubber extensions through which the milking may be observed.

In testimony whereof I have signed my name to this specification in the presence of two subscribing witnesses.

ADOLPHE RENELDE BROHET.

Witnesses:
ELY E. PALMER,
A. TH. SILBERAUPT.

Copies of this patent may be obtained for five cents each, by addressing the "Commissioner of Patents, Washington, D. C."